US00RE40323E

(19) United States
(12) Reissued Patent
Bae

(10) Patent Number: US RE40,323 E
(45) Date of Reissued Patent: May 20, 2008

(54) TOUCH PAD MOUNTING DEVICE FOR ELECTRONIC SYSTEM

(76) Inventor: Jae-yong Bae, 418 Maetan-dong, Paidal-gu, Suwon-city, Kyungki-do (KR)

(21) Appl. No.: 10/308,093

(22) Filed: Dec. 3, 2002

Related U.S. Patent Documents

Reissue of:
(64) Patent No.: 6,177,924
Issued: Jan. 23, 2001
Appl. No.: 09/219,518
Filed: Dec. 23, 1998

(30) Foreign Application Priority Data

Dec. 24, 1997 (KR) ..... 97-73686

(51) Int. Cl.
*G06F 1/16* (2006.01)

(52) U.S. Cl. ..... 345/157; 361/683; 361/686; 345/157

(58) Field of Classification Search ..... 345/157; 361/683, 686, 679–681
See application file for complete search history.

(56) References Cited

U.S. PATENT DOCUMENTS 4,831,359 A 5/1989 Newell
4,857,683 A * 8/1989 Maser ..... 200/5 A
4,988,982 A 1/1991 Rayner et al.
5,049,863 A * 9/1991 Oka ..... 345/163
5,339,213 A 8/1994 O'Callaghan
5,469,194 A 11/1995 Clark et al.
5,631,805 A 5/1997 Bonsall
5,654,872 A * 8/1997 Sellers ..... 361/680
5,689,400 A 11/1997 Ohgami et al.
5,694,123 A 12/1997 Selker et al.
5,793,355 A * 8/1998 Youens ..... 345/157
5,805,474 A * 9/1998 Danielson et al. ..... 364/708.1
5,914,703 A 6/1999 Herng-Chuen ..... 345/157
6,163,326 A * 12/2000 Klein et al. ..... 345/156
6,281,887 B1 8/2001 Wang
6,532,152 B1 * 3/2003 White et al. ..... 361/692

FOREIGN PATENT DOCUMENTS

JP 3-292523 12/1991
JP 9-330147 12/1997
JP 10-207630 8/1998

* cited by examiner

*Primary Examiner*—Yean-Hsi Chang
(74) *Attorney, Agent, or Firm*—Staas & Halsey, LLP

(57) ABSTRACT

A device for mounting a touch pad in an electronic system may be constructed using a touch pad supporting case that secures the touch pad to an inner surface of the housing that encloses the electronic system. The touch pad supporting case is made of a metallic material and is free from any plastics. This allows the touch pad unit to be thinner and lighter and avoids the need for performing a plating process on a plastic touch pad supporting case. This removes a safety hazard at manufacturing plants by avoiding exposing workers to the contaminants generated by the plating process.

17 Claims, 7 Drawing Sheets

TOUCH PAD MOUNTING DEVICE FOR ELECTRONIC SYSTEM

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all rights accruing thereto under 35 U.S.C. §119 through my patent application entitled Contrivance for Mounting a Pointing Device in an Electronic System earlier filed in the Korean Industrial Property Office on the 24th day of Dec. 1997 and there duly assigned Ser. No. 1997/73686.

BACKGROUND OF THE INVENTION

1. Field of the Invention

The present invention concerns a device for mounting a cursor movement control device in an electronic system such as computer and, more specifically, to a device for mounting a touch pad device in a portable computer.

2. Background Art

Various electromechanical devices are known in the art for effecting the movement of a cursor on a display device using control signals. For example, so-called "joy-sticks" are frequently used with computing equipment to move a cursor, or another image, that is displayed on the face of the display device. A typical joy-stick operates by producing control signals by means of electrical potentiometers linked to the movable actuating rod where the magnitude of the signal determines the rate of motion and the polarity of the signal determines the direction of cursor movement. Another well known device is the so-called "track ball". The track ball has a spherical member is mounted in a socket that allows the spherical member to rotate about any axis. By rotating the track ball control signals are generated that direct the motion of a cursor, or another image, along the face of a display device. Similar to the track ball is the so-called "mouse" that has a spherical member covered by a palm-sized housing. By pushing the palm-sized housing along a supporting surface the spherical member is rotated and signals are sent to the computer that control the motion of a cursor, or another image, along the face of a display device.

More recently developed than the above devices is the "touch pad". The touch pad allows a user to manipulate the position of a cursor, or another image, along the face of a display device by sliding a finger over the surface of the touch-pad. The touch pad can be made using a printed circuit board that has a pattern of conductors formed in a grid, using a predetermined spacing, that may is juxtaposed with a flexible plastic insulating layer having a pattern of metallization on the under surface. By depressing the flexible layer against the underlying printed circuit gird, signals are produced that are directly related to the particular point on the pad that is being touched.

A touch pad may be designed with several buttons that function similarity to the right and left buttons of a mouse. In the process of mounting a touch pad onto the housing of a portable computer, the touch pad plate is placed against the plastic housing and covered by a plastic mounting case. To protect the touch pad from electromagnetic interference it is necessary to plate the plastic case prior to using the plastic case to support the touch pad plate. The plating process, however, generates contaminants and can adversely affect the workers in the manufacturing facility where the touch pad device is produced. In addition, the use of the plastic mounting case, in addition to the plated metal, increases the weight of the portable computer and causes the thickness of the touch pad unit to be increased, thus restricting the design flexibility of the portable computer.

As such, I believe that it may be possible to improve on the contemporary art by providing a touch pad mounting device that does not require a plating process, that eliminates the use of a plastic case to support the touch pad device, that reduces the thickness of the touch pad unit, that increases the safety of workers in facilities that assembly the touch pads, and that reduces the weight of electrical systems that use the touch pad mounting device.

SUMMARY OF THE INVENTION

Accordingly, it is an object of the present invention to provide an improved touch pad mounting device.

It is another object to provide a touch pad mounting device that does not require a plating process, thus increasing the safety of workers in facilitates that produce touch pad devices.

It is still another object to provide a touch pad mounting device that eliminates the use of a plastic case to support the touch pad device.

It is yet another object to provide a touch pad mounting device that reduces the thickness of the touch pad unit.

It is still yet another object to provide a touch pad mounting device that reduces the weight of electrical systems that use the touch pad mounting device.

To achieve these and other objects a device for mounting a touch pad in an electronic system may be constructed using an opening formed in the housing to expose the touch pad that is attached to the inner surface of the housing. A plurality of lugs are formed on the inside of the housing around the opening to engage the touch pad supporting case that secures the touch pad to the housing. The touch pad supporting case is made of a metallic material and is free from any plastics. This allows the touch pad unit to be thinner and lighter and avoids the need for performing a plating process on a plastic touch pad supporting case. This removes a safety hazard at manufacturing plants by avoiding exposing workers to the contaminants generated by the planting process.

According to another embodiment of the present invention, a device for mounting a touch pad with a selective button set, or a plurality of buttons, to input a selection signal in an electronic system such as notebook computer having a system unit mounted in a housing may be constructed using a second opening formed in the housing to expose selective button set along with the touch pad structure described above. Plugs are formed on the inside of the housing near the selective button set mounting opening, and slots are formed in one end region of the selective button set. The selective button set is directly mounted in the second opening by means of the plugs fixedly being inserted into the slots of the selective button set. Preferably, the selective button set includes a first and a second selective button, and the selective button set mounting opening, or second opening, includes a first and a second opening part for respectively receiving the first and second selective buttons. In addition, a button stopper is further provided between the first and second opening parts to limit the downward movement of the first and second selective buttons.

The metal plate to fixedly mount the touch pad serves to shield electromagnetic interferences. It may be preferably made of a thin stainless steel plate with a thickness less than one millimeter to strengthen the device as well as reduce the weight and thickness of the housing.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
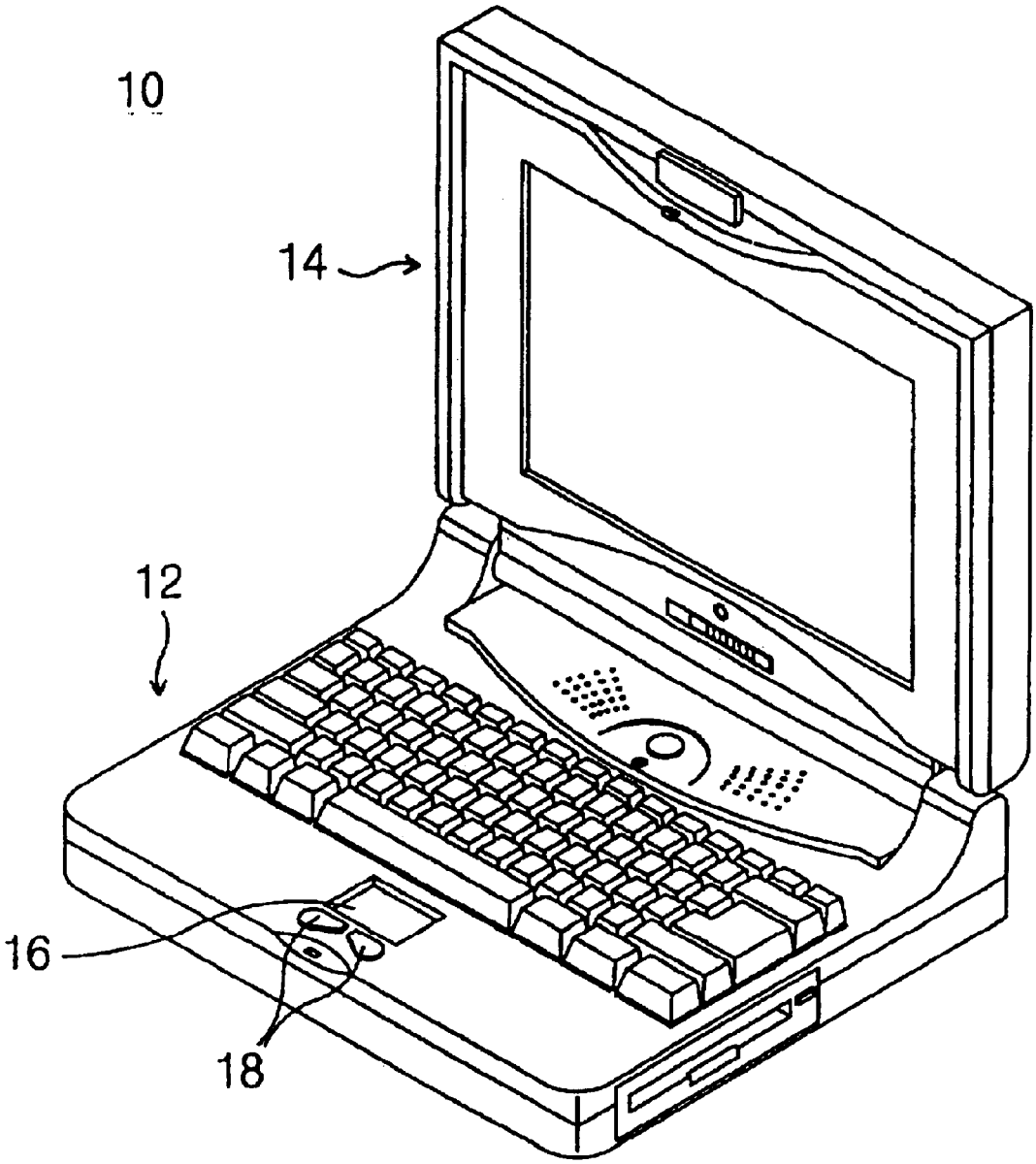
FIG. 1 is a perspective view illustrating a notebook computer.
Figure 2:
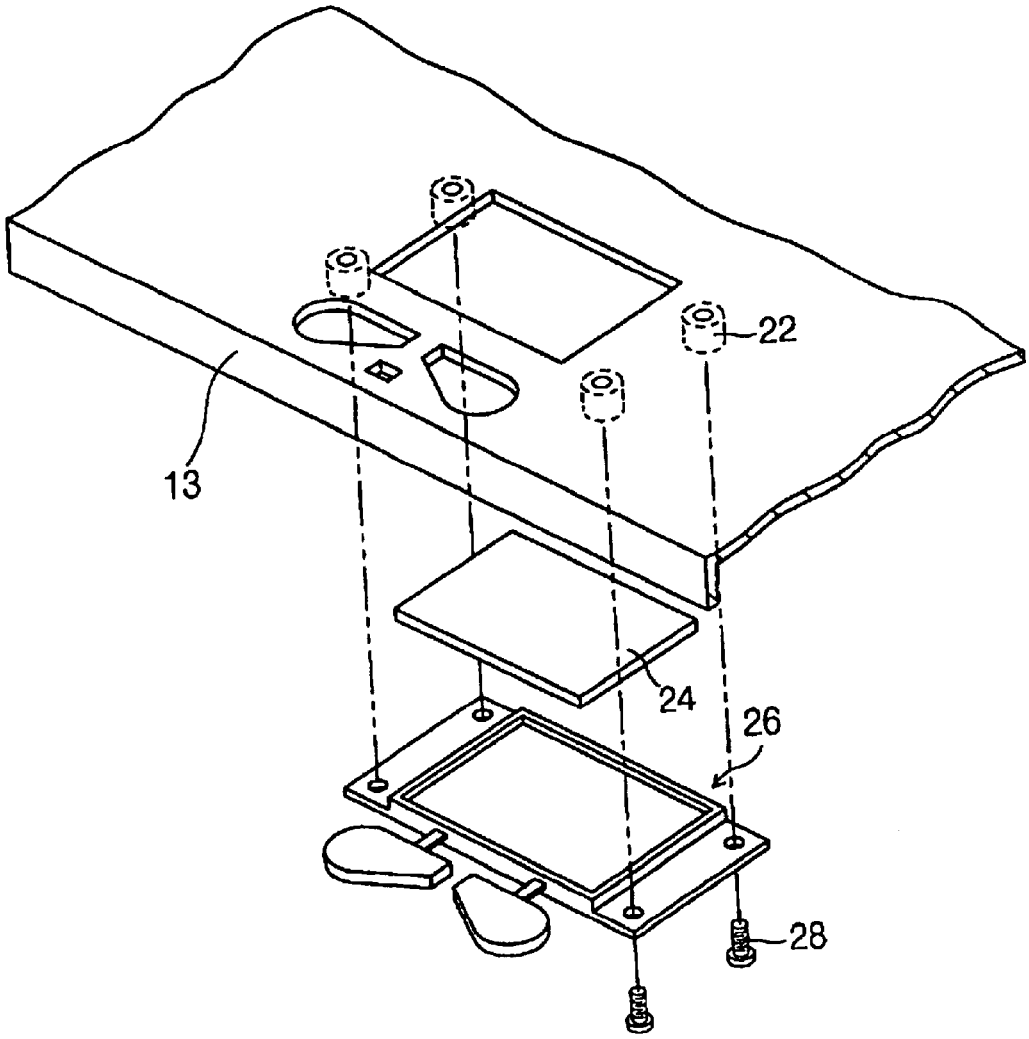
FIG. 2 is an exploded view illustrating the mounting of a touch pad in a notebook computer.

Turning now to the drawings, FIG. 1 illustrates notebook computer 10 that may be constructed using system unit 12 and display panel 14. Generally, the housing of system unit 12 is provided with a keyboard and touch pad 16 with selective button set 18 working like the right and left buttons of a mouse. Before mounting touch pad 16, touch pad plate 24 is placed, as shown in FIG. 2, on plastic mounting case 26, which is fixedly mounted to housing 13 by means of screws 28 that are inserted into bosses 22 that are formed on housing 13. Plastic mounting case 26 must be plated to shield electromagnetic interferences.

Figure 3:
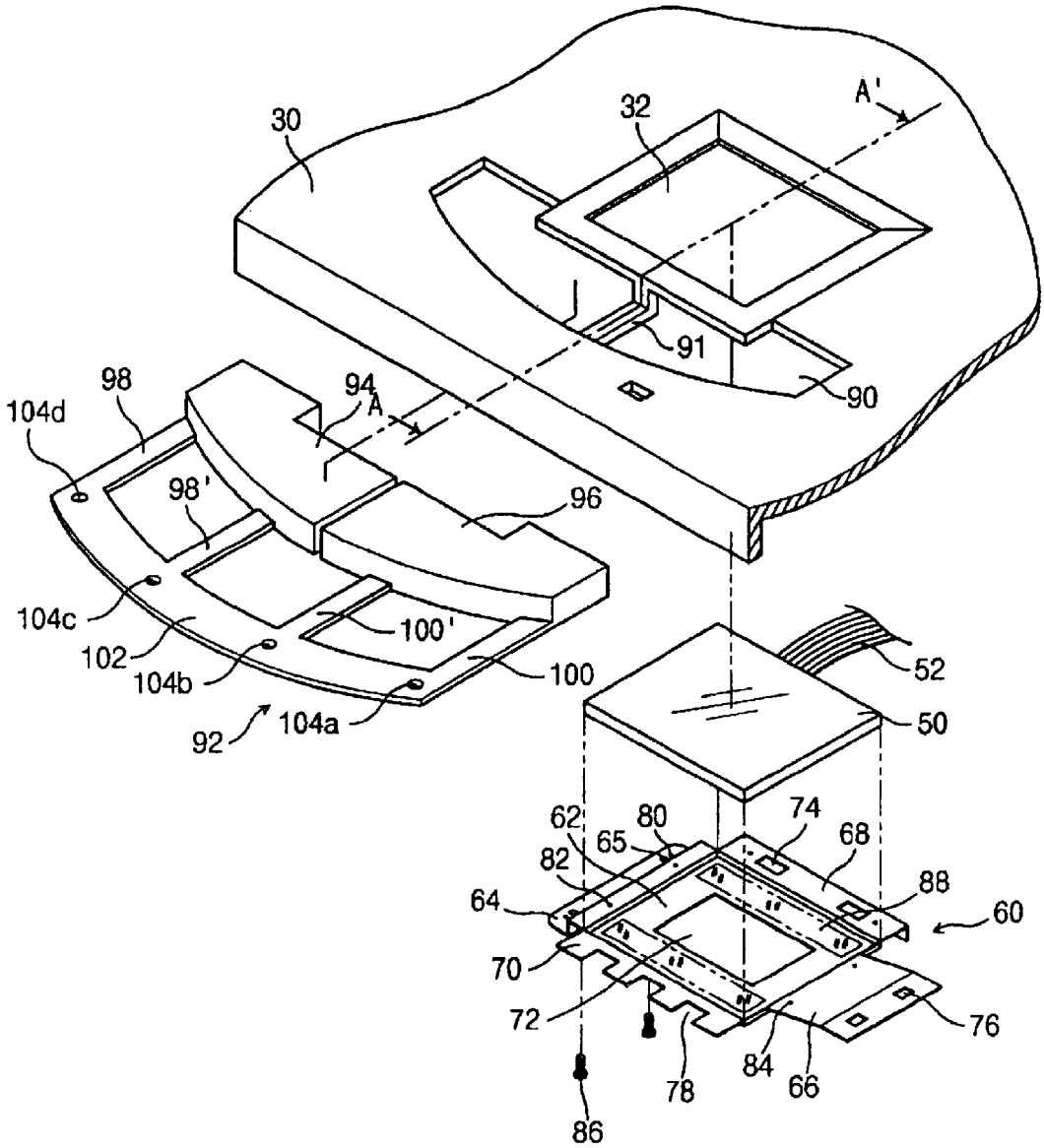
FIG. 3 is an exploded view illustrating a device as constructed according to the principles of the present invention for mounting a touch pad with a selective button set in a notebook computer.
Figure 4:
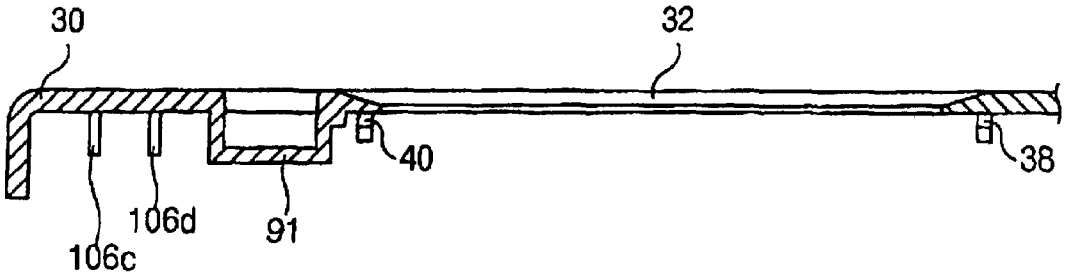
FIG. 4 is a cross sectional view taken along line A-A' of FIG. 3.
Figure 5:
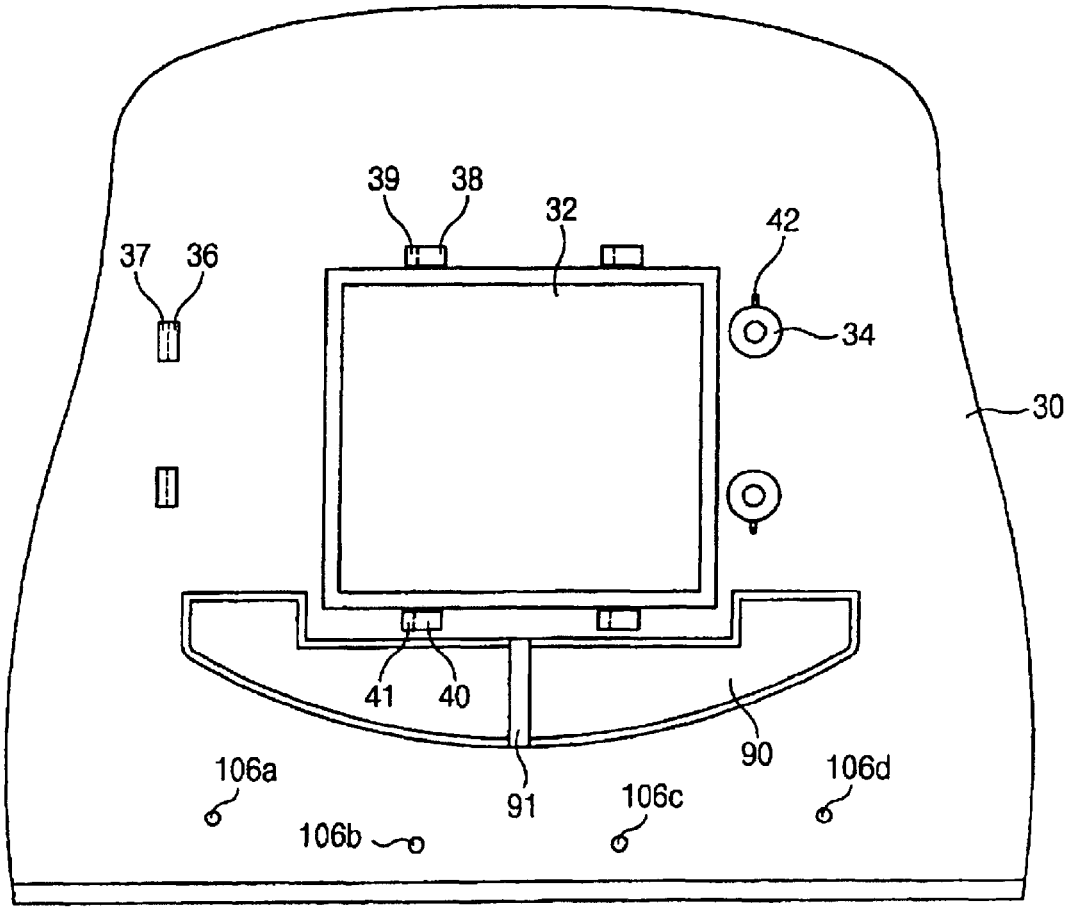
FIG. 5 is a plane view illustrating the inner surface of the housing of the electronic system to which the touch pad is mounted along with the selective button set.

FIGS. 3 through 5 illustrate a device for mounting touch pads as constructed according to the principles of the present invention. Housing 30 of the system unit, or base, of a notebook computer provided with a touch pad mounting opening, also referred to in the claims as an opening or a first opening, 32, around which fixing projections such as lugs and bosses are formed to hold metal plate, also referred to as a touch pad supporting case in the claims, 60. Metal plate 60 secures touch pad 50 onto the inside of the housing towards the touch pad mounting opening 32. In addition, selective button set, also referred to in the claims as a plurality of buttons, 92 is mounted in a selective button set mounting opening, also referred to in the claims as a second opening, 90 formed adjacent to the touch pad mounting opening in the housing, so that the buttons located on the selective button set may be pressed from outside of the housing. Formed across selective button set mounting opening 90 is button stopper 91 that limits the downward movement of buttons of selective button set 92, as shown in FIGS. 3 and 4. Selective button set 92 may be constructed using first selective button 94, second selective button 96, resilient strips 98, 98', 100, 100', and connecting strip 102. First and second selective buttons 94 and 96 are symmetrically positioned in selective button set mounting opening 90 with button stopper 91 facing the lower surfaces of the adjacent parts of the two selective buttons 94 and 96, as shown in FIG. 5. The two resilient strips 98 and 98' are connected between first selective button 94 and connecting strip 102, and the other two resilient strips 100 and 100' are connected between second selective button 96 and connecting strip 102. The resilient steps serve to recover the selective buttons after they have been depressed by a user. Connecting strip 102 connects the selective button set with the housing. In the present embodiment, a plurality of protuberances, also referred to as a plurality of plugs in the claims, 106a, 106b, 106c, 106d are integrally formed on the inside of the housing and can be inserted into corresponding slots 104a, 104b, 104c, 104d that formed in connecting strip 102. The protuberances and slots may be firmly fastened by means of heating.

Referring to FIG. 5, to attach metal plate 60 to the inside of the housing, there are provided bosses 34 and lugs 36, 38, 40 on the inside of the hosing around touch pad mounting opening 32. Lugs 36, 38, 40 are formed on the peripheral regions of the touch pad mounting opening 32 except 18 the peripheral region where bosses 34 are formed. Lugs 36, 38, 40 respectively have hooks 37, 39, 41 formed facing the direction opposite to that of bosses 34. It is desirable to have at least three lugs. Metal plate 60 supports the touch pad 50 towards the touch pad mounting opening 32, fastened to the bosses 34 and lugs 36, 38, 40. To this end, the metal plate 60 includes concave receiving part 62, fixing part 64, resilient part 66, first connecting part 68 and second connecting part 70. Receiving part 62 has cable aperture 72 for holding touch pad 50. Through cable aperture 72 is inserted a cable for connecting touch pad 50 with the electronic system. Fixing part 64 is extended from one side of receiving part 62 by a given interval, having slots 65 connected with bosses 34 by means of fasteners 86. Resilient part 66 is extended from the side of receiving part 62 opposite to fixing part 64 by a given interval, having slots 76 fastened to lugs 36 on the housing. Resilient part 66 is inclined by a given angle with respect to receiving part 62, as shown in FIG. 3, to impart a resiliency to the receiving part. First connection part 68 has slots 74 fastened to lugs 38. Second connecting part 70 is extended from the side of receiving part 62 opposite to first connecting part 68, having slots or cuts 78 fastened to lugs 40. In addition, fixing and resilient parts 64 and 66 are provided with protuberances 82, 84 to assist the mounting of touch pad 50 to housing 30. Protuberances 82, 84 are formed adjacent to the sides of resilient part 62 towards touch pad 50. Also formed the inside of housing 30 adjacent to bosses 34 are further protuberances 42 to fasten to slots 80 formed in fixing part 64. Slots 80 and protuberances 42 are to facilitate the connection of fixing part 64 to the bosses.

Figure 6:
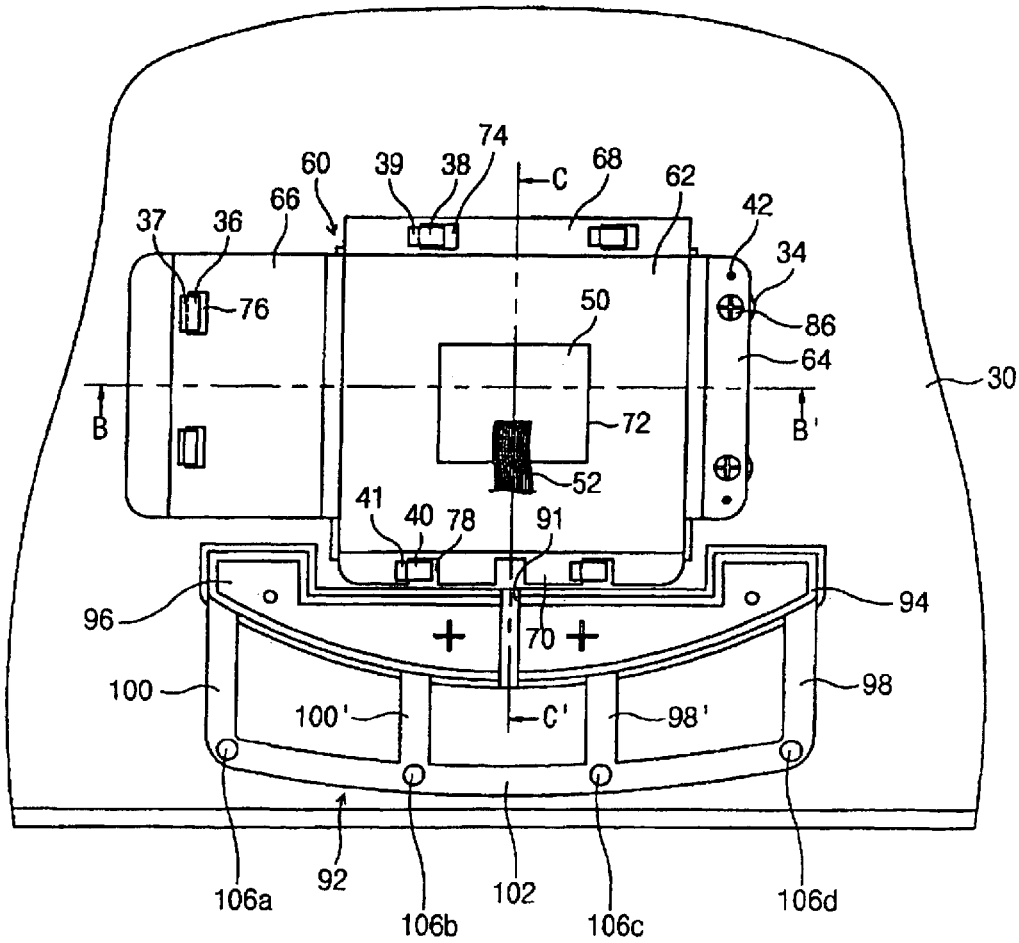
FIG. 6 is a view showing the touch pad and selective button set mounted to the inner surface of the housing of the electronic system.
Figure 7:
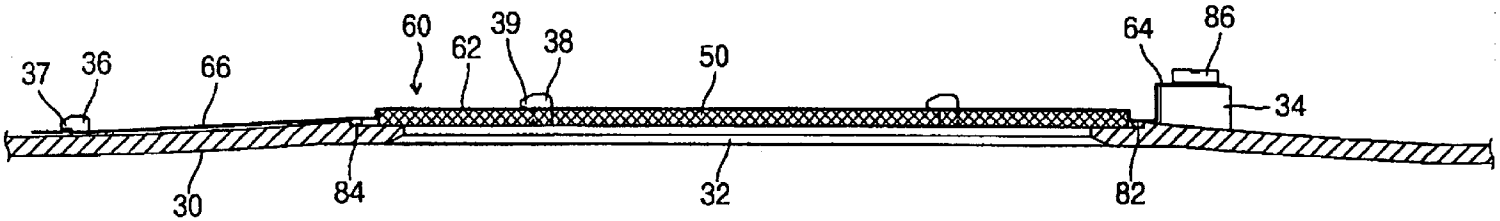
FIG. 7 is a partial cross sectional view taken along line B-B' of FIG. 6.
Figure 8:
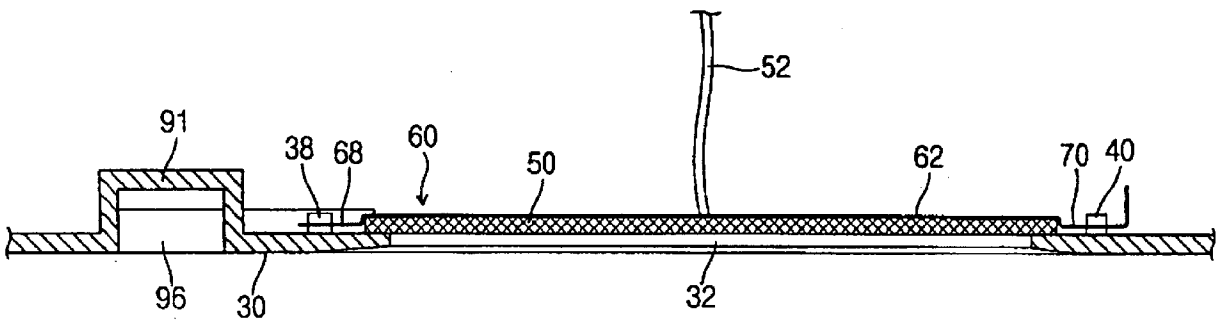
FIG. 8 is a partial cross sectional view taken along line C-C' of FIG. 6.

The mounting of the touch pad on the inside of the housing, as shown in FIGS. 6 through 8, starts with resilient part 66 of metal plate 60 being fastened to lugs 36 with slots 76 held by the hook of lug 36. At the same time, first and second connecting parts 68 and 70 are respectively connected to lugs 38 and 40. Then, pulling metal plate 60 towards bosses 34, fixing part 64 is securely placed on bosses 34 by means of slots 80 receiving protuberances 42. Finally fasteners 86 are turned through slot 65 of fixing part 64 into bosses 34.

Meanwhile, first and second selective buttons 94 and 96 of the selective button set 92 are inserted in selective button set mounting opening 90 while connecting strip 102 is connected to the inside of the housing by means of the slots 104a, 104b, 104c, 104d respectively holding plugs 106a, 106b, 106c, 106d. The slots and plugs may be firmly fastened with each other by the heat treatment s usually called heat stake. Provided on the lower side of the selective button set 92 is a circuit board with switches that act cooperatively with the touch pad.

Figure 9A:
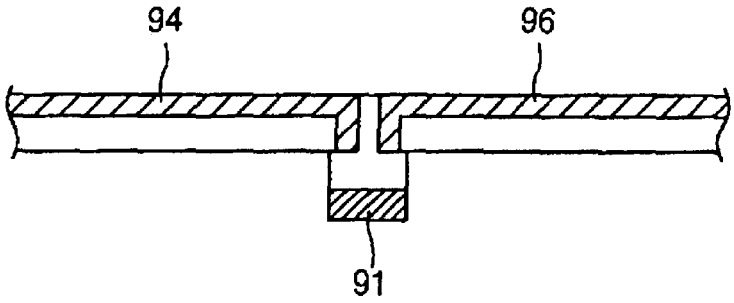
FIG. 9A is a partial cross sectional view illustrating the position of the first and second selective buttons when they are not externally pressed.
Figure 9B:
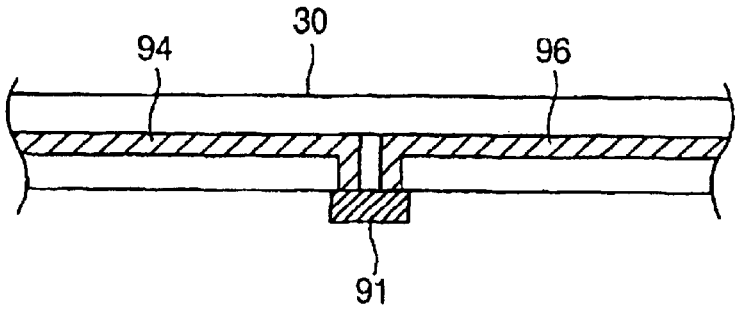
FIG. 9B is a partial cross sectional view illustrating the position of the first and second selective buttons when they are externally pressed.

Referring to FIGS. 9A and 9B, first and second selective buttons 94 and 96 serve as the left and right buttons of the mouse, and may be pressed separately or simultaneously. Pressing the first and second selective buttons after locating the pointer by touching the touch pad, the selective buttons 94 and 96 descends downwards. The descending movement of the buttons is limited by the button stopper 91. The position of the button stopper 91 may be determined according to the switches operated by the buttons 94 and 96.

Although this preferred embodiment of the present invention has been disclosed for illustrative purposes, those skilled in the art will appreciate that various modifications, additions and substitutions are possible, without departing from the scope and spirit of the invention as disclosed in the accompnahing claims. It is also possible that other benefits or uses of the currently disclosed invention will become apparent over time.

What is claimed is:

[1. A device for mounting a touch pad in an electronic system, comprising:

a housing enclosing said electronic system;

said housing bearing an opening facilitating tactile access, from outside said housing, to said touch pad;

a touch pad supporting case attachable to an inner surface of said housing to securely position said touch pad in a position aligning said touch pad with said opening in said housing;

said touch pad supporting case being formed of a metallic material and being free from plastic materials;

a plurality of lugs attached to said inner surface of said housing proximate to said opening; and said touch pad supporting case bearing a plurality of slots receivably engaging said plurality of lugs to secure said touch pad supporting case to said inner surface of said housing.]

[2. The device of claim 1 further comprised of said touch pad supporting case being formed of stainless steel.]

[3. The device of claim 2, further comprised of said touch pad supporting case being under one millimeter thick.]

[4. A device for mounting a touch pad in an electronic system, comprising:

a housing enclosing said electronic system and comprising:

said housing bearing a first opening facilitating tactile access, from outside said housing, to said touch pad; and said housings bearing a second opening positioned operably proximate to said first opening;

a touch pad supporting case attachable to an inner surface of said housing to securely position said touch pad in a position aligning said touch pad with said first opening in said housing;

said touch pad supporting case being formed of a metallic material and being free from plastic materials; and a plurality of buttons attached to an inner surface of said housing and positioned to align said plurality of buttons with said second opening, said second opening facilitating tactile contact, from outside said housing, with said plurality of buttons, mounted inside said housing;

a plurality of lugs attached to said inner surface of said housing, proximate to said first opening; and said touch pad supporting case bearing a plurality of slots receivably engaging said plurality of lugs to secure said touch pad supporting case to said inner surface of said housing.]

[5. The device of claim 4, further comprising a plurality of plugs formed on the inner surface of said housing operably proximate to said first opening.]

6. [The device of claim 5, further comprising] *A device for mounting a touch pad in an electronic system, comprising:*

*a housing enclosing said electronic system and comprising:*

*said housing bearing a first opening facilitating tactile access, from outside said housing, to said touch pad;*

*said housing bearing a second opening positioned operably proximate to said first opening;*

*a touch pad supporting case attachable to an inner surface of said housing to securely position said touch pad in a position aligning said touch pad with said first opening in said housing;*

*said touch pad supporting case being formed of a metallic material and being free from plastic materials;*

*a plurality of buttons attached to an inner surface of said housing and positioned to align said plurality of buttons with said second opening, said second opening facilitating tactile contact, from outside said housing, with said plurality of buttons, mounted inside said housing;*

*a plurality of lugs attached to said inner surface of said housing, proximate to said first opening;*

*said touch pad supporting case bearing a plurality of slots receivably engaging said plurality of lugs to secure said touch pad supporting case to said inner surface of said housing;*

*a plurality of plugs formed on the inner surface of said housing operably proximate to said first opening; and* a second plurality of slots formed on said plurality of buttons.

7. The device of claim 6, further comprised of said plurality of buttons are directly mounted in said second opening via said plurality of plugs being engaged with said second plurality of slots.

8. The device of claim 7, further comprising a button stopper attached proximate to said second opening to limit the downward movement of said plurality of buttons.

9. The device of claim 8 further comprised of said touch pad supporting case being formed of stainless steel.

10. The device of claim 9, further comprised of said touch pad supporting case being under one millimeter thick.

[11. A device for mounting a touch pad in an electronic system, comprising:

a housing enclosing said electronic system and comprising:

said housing bearing a first opening, facilitating tactile access, from outside said housing, to said touch pad;

a plurality of lugs attached to said inner surface of said housing proximate to said first opening; and said housing bearing a second opening positioned operably proximate to said first opening;

a touch pad supporting case attachable to an inner surface of said housing to securely position said touch pad in a position aligning said touch pad with said first opening in said housing;

said touch pad supporting case being formed of stainless steel, being free from plastic materials, being less than one millimeter thick, and bearing a plurality of slots receivably engaging said plurality of lugs of said housing to secure said touch pad supporting case to said inner surface of said housing; and a plurality of buttons attached to an inner surface of said housing and positioned to align said plurality of buttons with said second opening, said second opening facilitating tactile contact, from outside said housing, with said plurality of buttons, mounted inside said housing.]

[12. The device of claim 11, further comprising a plurality of plugs formed on the inner surface of said housing operably proximate to said first opening.]

13. [The device of claim 12, further comprising] *A device for mounting a touch pad in an electronic system, comprising:*

*a housing enclosing said electronic system and comprising:*

*said housing bearing a first opening, facilitating tactile access, from outside said housing, to said touch pad;*

*a plurality of lugs attached to said inner surface of said housing proximate to said first opening;*

*said housing bearing a second opening positioned operably proximate to said first opening;*

*a touch pad supporting case attachable to an inner surface of said housing to securely position said touch pad in a position aligning said touch pad with said first opening in said housing;*

*said touch pad supporting case being formed of stainless steel, being free from plastic materials, being less than one millimeter thick, and bearing a plurality of slots receivably engaging said plurality of lugs of said housing to secure said touch pad supporting case to said inner surface of said housing;*

*a plurality of buttons attached to an inner surface of said housing and positioned to align said plurality of buttons with said second opening, said second opening facilitating tactile contact, from outside said housing, with said plurality of buttons, mounted inside said housing;*

*a plurality of plugs formed on the inner surface of said housing operably proximate to said first opening; and* a second plurality of slots formed on said plurality of buttons.

14. The device of claim 13, further comprised of said plurality of buttons are directly mounted in said second opening via said plurality of plugs being engaged with said second plurality of slots.

15. The device of claim 14, further comprising a button stopper attached proximate to said second opening to limit the downward movement of said plurality of buttons.

16. [The housing of claim 17] *A housing for an electronic system, comprising:*

*a first opening which allows tactile access to a touch pad of said electronic system from outside said housing;*

*a second opening positioned adjacent the first opening;*

*a touch pad supporting case attachable to an inner surface of said housing, said touch pad supporting case being configured to position the touch pad in alignment with the first opening, and being formed substantially of metallic material;*

*at least one button moveably attachable to the inner surface of said housing and positioned in alignment with the second opening such that the second opening allows tactile access to said button from outside said housing;*

*at least one first fixing structure formed on said inner surface of said housing;*

*at least one second fixing structure which cooperates with said at least one first fixing structure to securely fix said touch pad supporting case to the inner surface of said housing;*

*wherein said at least one first fixing structure comprises at least one lug formed on the inner surface of said housing adjacent the first opening,*

*wherein said at least one second fixing structure comprises at least one slot formed on said touch pad supporting case, and*

*wherein said at least one lug includes a hook, and said touch pad supporting case is fastened to said housing by said at least lug being held using the hook.*

17. [The housing of claim 28,] *A housing for an electronic system, comprising:*

*a first opening which allows tactile access to a touch pad of said electronic system from outside said housing;*

*a second opening positioned adjacent the first opening;*

*a touch pad supporting case attachable to an inner surface of said housing, said touch pad supporting case being configured to position the touch pad in alignment with the first opening, and being formed substantially of metallic material;*

*at least one button moveably attachable to the inner surface of said housing and positioned in alignment with the second opening such that the second opening allows tactile access to said button from outside said housing;*

*at least one first fixing structure formed on said inner surface of said housing; and*

*at least one second fixing structure which cooperates with said at least one first fixing structure to securely fix said touch pad supporting case to the inner surface of said housing;*

*wherein said at least one first fixing structure comprises at least one boss formed on the inner surface of said housing adjacent the first opening,*

*wherein said at least one second fixing structure comprises at least one hole formed on said touch pad supporting case,*

*wherein said at least one button further comprises a flexible portion connected to the at least one button and which bends when the at least one button is pressed so as to allow the at least one button to move from a release position, and which allows the at least one button to return to the release position when the at least one button is released; and*

*wherein said housing has at least one protrusion; and the flexible portion has at least one hold to receivably engage the at least one protrusion.*

18. *The housing of claim 17, wherein:*

*a distal end of the at least one protrusion is deformed after the at least one protrusion engages the at least one hole of the flexible portion such that the flexible portion is fixedly held to said housing.*

19. [The method of claim 32,] *A method of mounting a touch pad in a housing for an electronic system, the method comprising:*

*mounting a touch pad supporting case formed substantially of metallic material to an inner surface of the housing so as to position a touch pad in alignment with a first opening of the housing and allow tactile access to the touch pad from outside the housing;*

*attaching at least one button, to the inner surface of the housing so as to be positioned in alignment with a second opening of the housing such that the second opening allows tactile access to the at least one button from outside the housing;*

*forming at least one fixing structure on said inner surface of said housing; and*

*forming at least one second fixing structure which cooperates with said at least one first fixing structure to securely fix said touch pad supporting case to the inner surface of said housing;*

*wherein the step of forming the at least one first fixing structure includes forming at least one lug on the inner surface of the housing adjacent the first opening;*

*wherein the step of forming the at least one second fixing structure includes forming at least one slot in said touch pad supporting case, and*

*wherein the at least one lug is formed to include a hook, and the method further comprises engaging the at least one slot using the hook so as to fasten the touch pad supporting case to the housing.*

20. [The method of claim 43,] *A method of mounting a touch pad in a housing for an electronic system, the method comprising:*

*mounting a touch pad supporting case formed substantially of metallic material to an inner surface of the housing so as to position a touch pad in alignment with a first opening of the housing and allow tactile access to the touch pad from outside the housing;*

*attaching at least one button, to the inner surface of the housing so as to be positioned in alignment with a second opening of the housing such that the second opening allows tactile access to the at least one button from outside the housing,*

*forming at least one fixing structure on said inner surface of said housing; and*

*forming at least one second fixing structure which cooperates with said at least one first fixing structure to securely fix said touch pad supporting case to the inner surface of said housing,*

*wherein the at least one button further comprises a flexible portion connected to the at least one button and which bends when the at least one button is pressed so as to allow the at least one button to move from a release position, and which allows the at least one button to return to the release position when the at least one button is released, and*

*wherein the housing has at least one protrusion, the flexible portion has at least one hole, and said attaching the at least one button comprises receivably engaging the at least one protrusion with the at least one hole of the flexible portion.*

21. *The method of claim 20, wherein the receivably engaging the at least one protrusion further comprises deforming a distal end of the at least one protrusion after the at least one protrusion engages the at least one hole of the flexible portion such that the flexible portion is fixedly held to the housing.*

22. [The method of claim 31,] *A method of mounting a touch pad in a housing for an electronic system, the method comprising:*

*mounting a touch pad supporting case formed substantially of metallic material to an inner surface of the housing so as to position a touch pad in alignment with a first opening of the housing and allow tactile access to the touch pad from outside the housing;*

*attaching at least one button, to the inner surface of the housing so as to be positioned in alignment with a second opening of the housing such that the second opening allows tactile access to the at least one button from outside the housing;*

*forming at least one fixing structure on said inner surface of said housing; and*

*forming at least one second fixing structure which cooperates with said at least one first fixing structure to securely fix said touch pad supporting case to the inner surface of said housing,*

*wherein the at least one button and the touch pad supporting case are formed as one body.*

23. [The housing of claim 62,] *A housing for an electronic system, comprising:*

*a first opening which allows tactile access to a touch pad of said electronic system from outside said housing;*

*a second opening positioned adjacent the first opening;*

*a touch pad supporting case attachable to an inner surface of said housing, said touch pad supporting case being configured to position the touch pad in alignment with the first opening, and being formed substantially of metallic material;*

*at least one button moveably attachable to the inner surface of said housing and positioned in alignment with the second opening such that the second opening allows tactile access to said button from outside said housing;*

*at least one first fixing structure formed on said inner surface of said housing;*

*at least one second fixing structure which cooperates with said at least one first fixing structure to securely fix said touch pad supporting case to the inner surface of said housing;*

*a plurality of plugs formed on the inner surface of said housing operably proximate to said first opening; and*

*a plurality of slots formed on said strip,*

*wherein said at least one button is directly mounted in said second opening via said plurality of plugs being engaged with said plurality of slots formed on said strip.*

[24. The device of claim 17, wherein said touch pad supporting case further comprises:

a receiving portion having a first surface on which the touch pad is received; and an attachment portion which extends from at least one side of the receiving portion, the attachment portion having a second surface for attaching said touch pad supporting case to said housing.]

[25. The device of claim 24, wherein:

the first surface defines a first plane, and the second surface defines a second plane different from the first plane.]

[26. The device of claim 24, wherein the first surface of said touch pad supporting case has a cutout portion exposing at least a portion of said touch pad therethrough.]

[27. The device of claim 26, wherein the touch pad is electrically connected with the electronic system using at least one electrical wire that passes through the cutout portion.]

[28. The device of claim 16, wherein said button set further comprises a flexible portion connected to the at least button and which bends when the at least one button is pressed so as to allow the at least one button to move from a release position, and which allows the at least one button to return to the release position when the at least one button is released.]

29. The device of claim 28, wherein:

said housing has at least one protrusion; and the flexible portion has at least one hole to receivably engage the at least one protrusion.

[30. The device of claim 29, wherein:

a distal end of the at least one protrusion is deformed, after the at least one protrusion engages the at least one hole such that the flexible portion is fixedly held to said housing.]

[31. A method of mounting a touch pad in an electronic system, the method comprising:

mounting a touch pad supporting case formed at least in part of metallic material to an inner surface of a housing so as to position a touch pad in alignment with a first opening of the housing and allow tactile access to the touch pad from outside the housing; and attaching a button set, which includes at least one button, to the inner surface of the housing so as to be positioned in alignment with a second opening of the housing such that the second opening allows tactile access to the at least one button from outside the housing, wherein the button set is separate from the touch pad supporting case.]

[32. The method of claim 31, wherein said mounting the touch pad supporting case further comprises providing at least one lug on the inner surface of the housing adjacent the first opening.]

[33. The method of claim 32, wherein said mounting the touch pad supporting case further comprises engaging at least one slot of the touch pad supporting case which receivably engages the at least one lug to secure the touch pad supporting case to the inner surface of the housing.]

[34. The method of claim 33, wherein:

the at least one lug includes a hook, and the engaging the at least one slot comprises engaging the at least one slot using the hook so as to fasten the touch pad supporting case to the housing.]

[35. The method of claim 31, wherein said mounting the touch pad supporting case further comprises using at least one screw to attach the touch pad supporting case to the housing.]

[36. The method of claim 33, wherein said mounting the touch pad supporting case further comprises using at least one screw to attach the touch pad supporting case to the housing.]

[37. The method of claim 33, wherein:

the touch pad supporting case includes a surface area and a peripheral edge, the peripheral edge defines a boundary of the surface area, and the at least one slot is formed entirely within the boundary of the touch pad supporting case.]

[38. The method of claim 33, wherein:

the touch pad supporting case includes a surface area and a peripheral edge, the peripheral edge defines a boundary of the surface area, and the at least one slot is formed at a location proximate to the peripheral edge such that the at least one slot forms a notch shape having at least one open end.]

[39. The method of claim 32, wherein said mounting the touch pad supporting case further comprises:

receiving the touch pad on a first surface of a receiving portion of the touch pad supporting case, and attaching a second surface of an attachment portion of the touch pad support case to the housing to attach the touch pad supporting case to the housing, the attachment portion extending from at least one side of the receiving portion.]

[40. The method of claim 39, wherein:

the first surface defines a first plane, and the second surface defines a second plane different from the first plane.]

[41. The method of claim 39, wherein the first surface of the touch pad supporting case has a cutout portion exposing at least a portion of the touch pad therethrough.]

[42. The method of claim 41, further comprising electrically connecting the touch pad with the electronic system using at least one electrical wire that passes through the cutout portion.]

[43. The method of claim 31, wherein the button set further comprises a flexible portion connected to the at least one button and which bends when the at least one button is pressed so as to allow the at least one button to move from a release position, and which allows the at least one button to return to the release position when the button is released.]

[44. The method of claim 43, wherein:

the housing has at least one protrusion, the flexible portion has at least one hole, and said attaching the button set comprises receivably engaging the at least one protrusion with the at least one hole of the flexible portion.]

[45. The method of claim 44, wherein the receivably engaging the at least one protrusion further comprises deforming a distal end of the at least one protrusion after the at least one protrusion engages the at least one hole such that the flexible portion is fixedly held to the housing.]

[46. The method of claim 31, wherein the button set and the touch pad supporting case are not integrally formed so as to form a common body.]

[47. A device for mounting a touch pad in an electronic system, the device comprising:

a housing enclosing the electronic system, said housing having:

a first opening which allows tactile access to the touch pad from outside said housing, and a second opening positioned adjacent the first opening;

a touch pad supporting case attachable to an inner surface of said housing, said touch pad supporting case to position the touch pad in alignment with the first opening, and being formed of a first material; and a button set attached to the inner surface of said housing, and including at least one button positioned in alignment with the second opening such that the second opening allows tactile access to said at least one button from outside said housing, wherein said button set is formed of a second material which is different from the first material.]

[48. The device of claim 47, wherein the first material comprises an electro-magnetic shielding material.]

[49. The device of claim 47, wherein the first material comprises a metal.]

[50. The device of claim 49, wherein the metal comprises a steel.]

[51. The device of claim 50, wherein the steel comprises a stainless steel.]

[52. The device of claim 51, wherein touch pad supporting case is formed of a thin plate having a thickness of 1 mm or less.]

[53. A device for mounting a touch pad in an electronic system, the device comprising:

a housing enclosing the electronic system, said housing having:

a first opening which allows tactile access to the touch pad from outside said housing, and a second opening positioned adjacent the first opening;

a touch pad supporting case attachable to an inner surface of said housing, said touch pad supporting case to position the touch pad in alignment with the first opening, and being formed of at least in part of a metallic material; and a button set attached to the inner surface of said housing, and including a button positioned in alignment with the second opening such that the second opening allows tactile access to said button from outside said housing, said button set being formed of another material which is not the metallic material.]

[54. The device of claim 53, wherein the metallic material comprises stainless steel, and the another material does not include stainless steel.]

[55. A device for mounting a touch pad in an electronic system, the device comprising:

a housing enclosing the electronic system, said housing having:

a first opening which allows tactile access to the touch pad from outside said housing, and a second opening positioned adjacent the first opening;

a touch pad supporting case attachable to an inner surface of said housing, said housing pad supporting case to position the touch pad in alignment with the first opening; and a button set attached to the inner surface of said housing, and including a button positioned in alignment with the second opening such that the second opening allows tactile access to said button from outside said housing, wherein said button set is not integral with the touch pad supporting case.]

[56. The device of claim 55, wherein the touch pad supporting case is formed of a first material, and the button set is formed of a second material which is different from the first material.]

[57. The device of claim 56, wherein one of the first and second materials comprises a metal.]

[58. The device of claim 56, wherein one of the first and second materials comprises an electro-magnetic shielding material.]

* * * * *